(12) United States Patent
Chen et al.

(10) Patent No.: US 8,460,724 B2
(45) Date of Patent: Jun. 11, 2013

(54) METHOD OF REDUCING THE PURINE CONTENT OF AN EDIBLE MATERIAL

(75) Inventors: Jen-Tao Chen, Taipei (TW); Chiou-Yen Wen, Hsinchu (TW); Fang-Hwa Sheu, Hsinchu (TW); Meng-Jen Tsai, Hsinchu (TW)

(73) Assignee: Food Industry Research and Development Institute, Hsinchu (TW)

( * ) Notice: Subject to any disclaimer, the term of this patent is extended or adjusted under 35 U.S.C. 154(b) by 58 days.

(21) Appl. No.: 12/754,903

(22) Filed: Apr. 6, 2010

(65) Prior Publication Data

US 2011/0091603 A1 Apr. 21, 2011

(30) Foreign Application Priority Data

Oct. 16, 2009 (TW) .............................. 98135113 A (51) Int. Cl.
*A23L 1/29* (2006.01)

(52) U.S. Cl.
USPC .................. 426/46; 426/7; 426/52; 426/634; 426/615

(58) Field of Classification Search
USPC .................................. 426/46, 7, 52, 634, 615
See application file for complete search history.

(56) References Cited

U.S. PATENT DOCUMENTS 6,013,288 A 1/2000 Shibano et al.

FOREIGN PATENT DOCUMENTS

| JP | 3824326 | 9/2006 |
| WO | WO2009/069704 | 6/2009 |

OTHER PUBLICATIONS

JP-2001-275599-Abstract-pp. 7-8.*
JP-61-242553-Abstract-pp. 4-5.*
Suhki-1999-VTT Culture Collection—Catalogue of Strains. 4th edition.*
Vogels, et al., "Degradation of Purines and Pyrimidines by microorganisms", Bacteriological Reviews, Jun. 1976, p. 403-468, vol. 40, No. 2.

* cited by examiner

*Primary Examiner* — D. Lawrence Tarazano
*Assistant Examiner* — Hamid R Badr
(74) *Attorney, Agent, or Firm* — Occhiuti Rohlicek & Tsao LLP (57) ABSTRACT

Disclosed herein is a method of reducing the purine content of an edible material, including treating an edible material having a first level of purine content with a microorganism capable of digesting purine compounds, such that the thus treated edible material has a second level of purine content lower than the first level of purine content, wherein the microorganism is selected from *Aspergillus oryzae* ATCC 11493, *Aspergillus oryzae* ATCC 26850, *Aspergillus oryzae* ATCC 44193, *Aspergillus oryzae* ATCC 26831, *Rhizopus oryzae* ATCC 52362, and combinations thereof. An edible material obtained from the aforementioned method is also disclosed.

10 Claims, 3 Drawing Sheets

METHOD OF REDUCING THE PURINE CONTENT OF AN EDIBLE MATERIAL

CROSS-REFERENCE TO RELATED APPLICATION

This application claims priority of Taiwanese application no. 098135113, filed on Oct. 16, 2009.

BACKGROUND OF THE INVENTION

1. Field of the Invention

This invention relates to a method of reducing the purine content of an edible material. The method comprises treating an edible material having a first level of purine content with a microorganism capable of digesting purine compounds, such that the thus treated edible material has a second level of purine content lower than the first level of purine content. The microorganism is selected from the group consisting of *Aspergillus oryzae* ATCC 11493 (BCRC 30118), *Aspergillus oryzae* ATCC 26850 (BCRC 30133), *Aspergillus oryzae* ATCC 44193 (BCRC 30222), *Aspergillus oryzae* ATCC 26831 (BCRC 30235), *Rhizopus oryzae* ATCC 52362 (BCRC 31108), and combinations thereof. This invention also relates to an edible material obtained from the aforementioned method.

2. Description of the Related Art

Gout is a disease resulting from deposition of monosodium urate crystals, which is induced by overproduction or underexcretion of uric acid. Generally, more than 90% of uric acid exists in a form of monosodium urate at pH 7. Monosodium urate crystals may deposit in articular cartilage, synovial fluid, tendon, and other soft tissues, or may form uric acid stones in kidney. Gout normally correlates to increase of serum uric acid levels, and clinical symptoms thereof include acute and chronic arthritis, tophi, interstitial renal disease, uric acid nephrolithiasis, etc.

A male with a serum uric acid level higher than 7 mg/dL (420 μmol/L) and a female with a serum uric acid level higher than 6 mg/dL (360 μmol/L) are regarded as having hyperuricemia. Hyperuricemia is a factor in development of gout. However, relationship between hyperuricemia and acute gout is still uncertain. Furthermore, hyperuricemia is found to be associated with development of hypertriglyceridemia, diabetes mellitus, and coronary artery disease.

Uric acid is the final metabolism product of purine and is excreted in urine. Many pathological studies indicate that ingestion of purine-rich food is the cause of gout and hyperuricemia. Due to over-ingestion of the purine-rich food, obesity, etc., incidence and prevalence regarding gout and hyperuricemia have gradually increased. Moreover, patients with gout or hyperuricemia tend to be younger. Therefore, reduction of purine ingestion is considered as an effective way to prevent gout and hyperuricemia.

Examples of the purine-rich food are mushrooms, legumes, meat, seafood, soft roe, eggs, alcoholic beverages, and so forth. Most of the purine-rich food contains abundant nutrition and many biologically active ingredients. Since the purine-rich food may give rise to gout, the same is not suitable for everyone. Consequently, effectively reducing the purine content of the purine-rich food is an important goal.

Examples of conventional physical and chemical methods for reducing the purine content of the purine-rich food include processing treatment (e.g., washing, boiling, steam cooking, roasting, and drying) for lowering the purine content of seafood (e.g., fish and shrimp), use of adsorbent (e.g., activated charcoal and zeolite) for removing purine compounds in fermented malt beverages, and reduction in amount of barley malt and dilution treatment for reducing the purine content of beers.

In recent years, biological methods (such as biodecomposition) of reducing the purine content of food are highly regarded.

G. D. Vogels and C. Van Der Drift have reported that *Aspergillus oryzae* is able to generate xanthine dehydrogenase (XDH), uricase (Uri), allantoinase (An), and allantoicase (Ac) (G. D. Vogels and C. Van Der Drift (1976), *Bacteriol. Rev.,* 40:403-468). *Aspergillus oryzae* is usually used to produce soybean sauce, miso, vinegar, sweet bean sauce, and so forth, and is also applied to generate various enzymes such as amylase and protease.

*Rhizopus oryzae* is a filamentous fungus, and is frequently used to produce alcoholic beverages and various organic acids such as fumaric acid, succinic acid, oxalic acid, citric acid, and lactic acid.

U.S. Pat. No. 6,013,288 discloses a process for manufacturing beer having a reduced content of purine compounds by using wort having a reduced content of purine nucleosides as a result of decomposing purine nucleosides into purine bases by using isolated purine nucleoside phosphorylase and/or isolate purine nucleosidase. The purine nucleosidase may be obtained from the genera *Aspergillus* (e.g., *Aspergillus oryzae* (IAM 2630)), *Bacillus, Saccharomyces*, etc.

There is still a need in the art to provide a method of efficiently reducing the purine content of food.

SUMMARY OF THE INVENTION

According to a first aspect, this invention provides a method of reducing the purine content of an edible material. The method comprises treating an edible material having a first level of purine content with a microorganism capable of digesting purine compounds, such that the thus treated edible material has a second level of purine content lower than the first level of purine content. The microorganism is selected from the group consisting of *Aspergillus oryzae* ATCC 11493 (BCRC 30118), *Aspergillus oryzae* ATCC 26850 (BCRC 30133), *Aspergillus oryzae* ATCC 44193 (BCRC 30222), *Aspergillus oryzae* ATCC 26831 (BCRC 30235), *Rhizopus oryzae* ATCC 52362 (BCRC 31108), and combinations thereof.

According to a second aspect, this invention provides an edible material, which is obtained from the aforementioned method.

BRIEF DESCRIPTION OF THE DRAWINGS

The above and other features and advantages of the present invention will become apparent in the following detailed description of the preferred embodiments with reference to the accompanying drawings, of which.

DETAILED DESCRIPTION OF THE PREFERRED EMBODIMENTS

For the purpose of this specification, it will be clearly understood that the word "comprising" means "including but not limited to", and that the word "comprises" has a corresponding meaning.

It is to be understood that, if any prior art publication is referred to herein, such reference does not constitute an admission that the publication forms a part of the common general knowledge in the art, in Taiwan or any other country.

Unless otherwise defined, all technical and scientific terms used herein have the meaning commonly understood by a person skilled in the art to which this invention belongs.

Numerous studies indicate that ingestion of purine-rich food causes gout and hyperuricemia. Even though most of the purine-rich food contains abundant nutrition and a great amount of biologically active ingredients, the same is not suitable for everyone. Thus, effectively reducing the purine content of the purine-rich food is an important goal. In order to achieve the goal, the applicants have attempted to preliminarily screen 24 strains capable of digesting purine bases from 202 known food safety strains that include 11 strains of *Aspergillus oryzae* and 11 strains of *Rhizopus oryzae*. Further research by the applicants shows that among the aforementioned 24 strains, *Aspergillus oryzae* ATCC 11493 (BCRC 30118), *Aspergillus oryzae* ATCC 26850 (BCRC 30133), *Aspergillus oryzae* ATCC 44193 (BCRC 30222), *Aspergillus oryzae* ATCC 26831 (BCRC 30235), and *Rhizopus oryzae* ATCC 52362 (BCRC 31108) all have the ability to digest purine compounds, thereby being able to reduce the total purine content of a water extract of a mushroom or soybean milk. As used herein, the term "total purine content" refers to the sum of adenine, guanine, hypoxanthine, and xanthine.

Accordingly, this invention provides a method of reducing the purine content of an edible material. The method comprises treating an edible material having a first level of purine content with a microorganism capable of digesting purine compounds, such that the thus treated edible material has a second level of purine content lower than the first level of purine content. The microorganism is selected from the group consisting of *Aspergillus oryzae* ATCC 11493 (BCRC 30118), *Aspergillus oryzae* ATCC 26850 (BCRC 30133), *Aspergillus oryzae* ATCC 44193 (BCRC 30222), *Aspergillus oryzae* ATCC 26831 (BCRC 30235), *Rhizopus oryzae* ATCC 52362 (BCRC 31108), and combinations thereof.

As used herein, the term "purine" or "purine compound" refers to a compound having a purine skeleton, and comprises purine bases, purine nucleosides, purine nucleotides, and nucleic acid.

As used herein, the term "purine base" refers to purine (i.e., 9H-imidazo[4,5-d]pyrimidine) and the substituted purines and their tautomers. Examples of the purine base include, but are not limited to, adenine, guanine, hypoxanthine, and xanthine.

As used herein, the term "purine nucleoside" refers to a glycoside, wherein a purine base and a reducing group of a sugar molecule are linked via an N-glycoside bond. Examples of the purine nucleoside include, but are not limited to, adenosine, guanosine, and inosine.

As used herein, the term "purine nucleotide" refers to a compound that has a purine nucleoside and at least a phosphate group bound to a sugar molecule of the purine nucleoside via a phosphoester bond. Examples of the purine nucleotide include, but are not limited to, adenylic acid, guanylic acid, and inosinic acid.

As used herein, the term "nucleic acid" refers to a deoxyribonucleic acid (DNA) molecule or ribonucleic acid (RNA) molecule in either single- or double-stranded form, or an analogue thereof, and comprises naturally occurring nucleotides and artificial chemical mimics. As used herein, the term "nucleic acid" can be interchangeably used with the term "gene", the term "cDNA", the term "mRNA", the term "oligonucleotide", and the term "polynucleotide".

According to this invention, after treating the edible material with the microorganism, the microorganism can be removed from the edible material by virtue of a separation treatment. The separation treatment may be conducted via an ordinary process (e.g., centrifugation and filtration) known to a skilled artisan.

According to this invention, the edible material may be natural or processed. Examples of the edible material include, but are not limited to, a mushroom product, a legume product, an alcoholic beverage, a fruit beverage, a vegetable beverage, or a fermented product (such as fermented milk and vinegar). In a preferred embodiment of this invention, the edible material is a mushroom product or a legume product.

The mushroom product suitable for this invention may be an extract of a mushroom (e.g., a water extract of a mushroom, and an organic solvent-extracted product of a mushroom), mushroom seasoning, or mushroom soup stock.

According to this invention, the mushroom may be *Lentinus edodes*, *Flammulina velutipes*, *Pleurotus ostreatus*, *Agrocybe aegerita*, *Agaricus bisporus*, *Ganoderma lucidium*, *Hericium erinaceus*, *Termitomyces albuminosus*, or *Auricularia auricular*.

In a preferred embodiment of this invention, the edible material is the water extract of the mushroom product, which is selected from the group consisting of a water extract of *Lentinus edodes*, a water extract of *Flammulina velutipes*, and a water extract of *Pleurotus ostreatus*. Preferably, the edible material is the water extract of *Lentinus edodes*.

The legume product suitable for this invention may be soybean milk, fermented soybean milk, salted black bean, soybean sauce, miso, chili bean sauce, sweet bean sauce, or Chinese cheese. In a preferred embodiment of this invention, the edible material is soybean milk.

The alcoholic beverage suitable for this invention may be beer, Shao-Hsing wine, sake, red wine, white wine, or fruit wine.

The fruit that can be used to make the fruit beverage suitable for this invention may be an apple, a peach, a banana, a strawberry, a watermelon, an orange, grapes, a sugar cane, a pear, a litchi, or a coconut.

The vegetable that can be used to make the vegetable beverage suitable for this invention may be a pumpkin, a carrot, a tomato, a bell pepper, celery, spinach, corn, kale, parsley, cabbage, or broccoli.

The fermented product suitable for this invention may be yogurt, sour milk, frozen yogurt, or a lactic acid bacteria-fermented beverage.

Preferably, the microorganism used to treat the water extract of the mushroom product or the soybean milk has a concentration ranging from $3.4 \times 10^5$ to $3.4 \times 10^6$ spore/ml. More preferably, the microorganism used to treat the water extract of the mushroom product or the soybean milk has a concentration ranging from $3.4 \times 10^5$ to $1.3 \times 10^6$ spore/ml. In a preferred embodiment of this invention, the microorganism used to treat the water extract of the mushroom product or the soybean milk has a concentration of $1.3 \times 10^6$ spore/ml.

Preferably, the microorganism is used to treat the edible material at a temperature ranging from 20° C. to 37° C. In a preferred embodiment of this invention, the microorganism is used to treat the edible material at 25° C.

This invention also provides an edible material obtained from the abovementioned method. Percentage reduction of total purine content of the edible material has been determined, and the result shows that the edible material thus made has a small amount of purines.

This invention will be further described by way of the following examples. However, it should be understood that the following examples are solely intended for the purpose of illustration and should not be construed as limiting the invention in practice.

EXAMPLES

Experimental Materials:
1. Water Extract of Mushroom Product:

Water extracts of mushroom products were prepared by dint of the following procedures.

Fresh *Flammulina velutipes* and *Pleurotus ostreatus* (both purchased from a hypermarket in Hsinchu, Taiwan) were subjected to freeze drying using a lyophilization machine. The freeze-dried *Flammulina velutipes* and *Pleurotus ostreatus*, and previously dried *Lentinus edodes* (purchased from XinShe Cooperative, Taichung County) were ground into powder using a grinding machine (Model no. D3V-10, Yu Chi Machinery Co., Ltd., Taiwan).

Each of 60 g of the *Flammulina velutipes* powder, 60 g of the *Pleurotus ostreatus* powder, and 60 g of the *Lentinus edodes* powder was mixed with 600 mL of distilled water in a 1 L serum bottle, followed by extraction at 121° C. for 20 minutes. Each of the resultant aqueous mixtures was cooled down to room temperature and was subsequently centrifuged at 3000×g for 20 minutes using a centrifuge (Model no. himac CR21E, Hitachi). 35 mL of each of the supernatant was added into a 250 mL shake flask, followed by sterilization at 121° C. and 0.103 MPa for 15 minutes. Accordingly, a water extract of *Flammulina velutipes*, a water extract of *Pleurotus ostreatus*, and a water extract of *Lentinus edodes* were obtained and served as stock solution.

2. Agar:

Tryptic soy agar (TSA) (DIFCO 0369), nutrient agar (DISCO 0001), and YM agar (DISCO 0712) were purchased from Difco Laboratories Inc., USA. Potato dextrose agar (PDA) (Merck 110130) was purchased from Merck, Germany.

General Experimental Procedures:
1. Determination of Percentage Reduction of Total Purine Content:
(1) Acid Hydrolysis Method:

The acid hydrolysis method is slightly modified according to the method described by S. N. Lou and T. Y. Chen (S. N. Lou and T. Y. Chen (1997), *Food Science*, 24:1-11). First, 200 mg of the freeze-dried fermented product to be made in the following examples (e.g., freeze-dried fermented liquid of a water extract of a mushroom product or freeze-dried fermented liquid of soybean milk) was added in a glass tube with screw cap, followed by evenly mixing with 1 mL of deionized water and 10 mL of trifluoroacetic acid/formic acid (v/v=1:1) via vibration. Sequentially, the resultant mixture was placed in a water bath of 90° C. for 15 minutes, and was transferred to an ice-water bath so as to be cooled down. The resultant mixture was then rinsed using deionized water so as to be removed from the glass tube to a 250 mL round-bottom flask. The resultant mixture in the 250 mL flask was subjected to decompress concentrating at 50° C. using BÜCHI Rotary Evaporator R-200 (Switzerland). Afterward, the resultant concentrate was dissolved in 10 mL of $KH_2PO_4$ buffer solution (0.02 M, pH 4.0), followed by filtrating with a 0.2 μm filter membrane (Sartorius Minisart NY25, Germany). The acquired filtrate served as a test sample for the following high performance liquid chromatography (HPLC).

In addition, the unfermented water extract of the mushroom product or the unfermented soybean milk (both were not treated with the microorganism and were freeze-dried) was used as the control group, and was subjected to the abovementioned acid hydrolysis method so as to make an unfermented test sample thereof.

(2) HPLC:

Content of adenine, guanine, hypoxanthine, and xanthine was measured using a high performance liquid chromatography system (Hitachi L-7100 Liquid Chromatography, Japan) equipped with an ultraviolet detector (Hitachi UV-VIS Detector L-7420, Japan). The column used for HPLC is Hypersil BDS C18 (particle size: 5 μm, length: 250 mm, ID: 4.6 mm). The operation conditions of HPLC are as follows: mobile phase is 0.02 M $KH_2PO_4$ buffer solution (pH 4.0); flow rate is 1 mL/min; injection volume of a test sample is 10 μL; detection wavelength is 254 nm; and retention times of adenine, guanine, hypoxanthine, and xanthine standards are 9.59 min, 6.79 min, 7.24 min, and 8.10 min, respectively. Each of the test samples was analyzed at least thrice. Total purine content is calculated by adding up the measured content of adenine, guanine, hypoxanthine, and xanthine.

(3) Calculation of Percentage Reduction of Total Purine Content:

Percentage reduction of total purine content regarding the water extract of the mushroom product and the soybean milk can be calculated by substituting the total purine content as calculated according to the preceding section, entitled "(2) HPLC", into the following formulas:

$$A=(B-C)/B \times 100 \qquad (1)$$

$$A=(B'-C')/B' \times 100 \qquad (2)$$

where
- A=percentage reduction of total purine content
- B=total purine content of the unfermented water extract of the mushroom product
- B'=total purine content of the unfermented soybean milk
- C=total purine content of the fermented liquid of the water extract of the mushroom product
- C'=total purine content of the fermented liquid of the soybean milk

Example 1

Preliminary Screening of Microorganism Capable of Digesting Adenine, Guanine, and Uric Acid Experimental Materials:

1. 202 food safety strains used in the following experiment were purchased from Biosource Collection and Research Center (BCRC) belonging to Food Industry Research and Development Institute (FIRDI) (331 Shih-Pin Road, Hsinchu 300, Taiwan). The 202 food safety strains belong to the following 18 genera: *Acetobacter, Aspergillus, Bacillus, Bifidobacterium, Botrytis, Enterococcus, Gluconacetobacter, Gluconobacter, Lactobacillus, Lactococcus, Mortierella, Penicillium, Propionibacterium, Rhizopus, Saccharomyces, Sporolactobacillus, Streptococcus,* and *Trichoderma*.

2. Uric acid agar medium used in the following experiment was formulated according to the recipe shown in Table 1.

TABLE 1

| Recipe for uric acid agar medium | |
|---|---|
| Content | Concentration (%) (w/v) |
| $MgSO_4 \cdot 7H_2O$ | 0.02 |
| $FeSO_4 \cdot 7H_2O$ | 0.00005 |
| $MnSO_4 \cdot 7H_2O$ | 0.002 |
| $CaCl_2$ | 0.005 |
| $K_2HPO_4$ | 0.25 |
| $KH_2PO_4$ | 0.5 |
| Uric acid* | 0.15 |
| Agar | 1.5 |

Rest of the content is distilled water.
pH of the medium was adjusted to 7.2 using NaOH.
*Uric acid powders were dissolved in 0.075N NaOH solution, and 10% $KH_2PO_4$ solution was used to adjust pH of the resultant mixture to 7.0.

3. In the following experiment, adenine agar medium and guanine agar medium were formulated mainly according to the recipe shown in Table 1, except that adenine and guanine were used to replace uric acid.

Experimental Procedures:

The 202 food safety strains were activated according to optimum conditions (such as temperature and medium) suggested by BCRC. Afterward, each of the food safety strains was inoculated on uric acid agar medium, adenine agar medium, and guanine agar medium, and was cultivated at optimum temperature for 7 days. The growth condition of each of the food safety strains on uric acid agar medium, adenine agar medium, and guanine agar medium was directly observed by human vision.

Results:

24 strains (accession numbers and names are shown in Table 2) out of the 202 food safety strains are able to grow on each of adenine agar medium, guanine agar medium, and uric acid agar medium, thereby being capable of utilizing adenine, guanine, and uric acid as energy source for growth. The applicants hence deduce that the 24 strains may have the ability to digest purine bases.

Particularly, the applicants found that among the 202 food safety strains used in the experiment, 11 strains are *Aspergillus oryzae*, and 11 strains are *Rhizopus oryzae*. However, only 6 strains out of the 11 strains of *Aspergillus oryzae* and only 6 strains out of the 11 strains of *Rhizopus oryzae* are able to digest adenine, guanine, and uric acid. The fact indicates that not all strains belonging to *Aspergillus oryzae* or *Rhizopus oryzae* have the ability to digest adenine, guanine, and uric acid.

TABLE 2

| 24 food safety strains capable of digesting adenine, guanine, and uric acid | |
|---|---|
| Accession number | Name |
| BCRC 10272 | *Bacillus coagulans* Hammer |
| BCRC 14718 | *Bacillus subtilis* subsp. *subtilis* (Ehrenberg) Cohn |
| BCRC 20582 | *Saccharomyces cerevisiae* Meyen ex Hansen |
| BCRC 21593 | *Saccharomyces cerevisiae* Meyen ex Hansen |
| BCRC 30118 | *Aspergillus oryzae* var. *oryzae* (Ahlburg) Cohn |
| BCRC 30133 | *Aspergillus oryzae* var. *viridi* Murakami |
| BCRC 30222 | *Aspergillus oryzae* var. *oryzae* (Ahlburg) Cohn |
| BCRC 30235 | *Aspergillus oryzae* var. *oryzae* (Ahlburg) Cohn |
| BCRC 31108 | *Rhizopus oryzae* Went & Prinsen Geerligs |
| BCRC 31152 | *Rhizopus oryzae* Went & Prinsen Geerligs |
| BCRC 31494 | *Aspergillus niger* var. *niger* van Tieghem |
| BCRC 31651 | *Rhizopus oryzae* Went & Prinsen Geerligs |
| BCRC 31652 | *Aspergillus oryzae* var. *oryzae* (Ahlburg) Cohn |
| BCRC 31883 | *Aspergillus niger* var. *niger* van Tieghem |
| BCRC 32126 | *Aspergillus niger* var. *niger* van Tieghem |
| BCRC 32148 | *Aspergillus oryzae* var. *effusus* (Tiraboschi) Ohara |
| BCRC 32229 | *Rhizopus oryzae* Went & Prinsen Geerligs |
| BCRC 32265 | *Aspergillus sojae* Sakagushi & Yamada |
| BCRC 32802 | *Rhizopus oryzae* Went & Prinsen Geerligs |
| BCRC 32963 | *Rhizopus oryzae* Went & Prinsen Geerligs |
| BCRC 33468 | *Aspergillus niger* var. *macrosporus* Koaze |
| BCRC 35695 | *Trichoderma harzianum* Rifai |
| BCRC 35696 | *Trichoderma harzianum* Rifai |
| BCRC 35697 | *Trichoderma hamatum* (Bonorden) Bainier |

Example 2

Effect of Strains Capable of Digesting Purine Bases on Total Purine Content of Fermented Liquid of Water Extract of *Lentinus edodes*

In order to confirm that the 24 strains as obtained from the above Example 1 are able to degrade purine compounds, the following experiment was performed.

Experimental Procedures:

A. Preparation of Spore Inoculums of Strains Capable of Digesting Purine Bases:

The 24 strains as obtained from the above Example 1 were cultivated for 10 days according to cultivation conditions shown in Table 3 so that each of the strains was able to grow on the respective medium and produced spores. 20 glass beads (diameter=40 mm) were added to each of the mediums, followed by shaking until spores on each of the mediums were attached to the glass beads. 5 mL of sterile water was used to wash the glass beads so as to suspend the spores attached to the glass beads. The resultant suspension served as spore inoculums in this example.

TABLE 3

Cultivation conditions for 24 strains capable of digesting purine bases

| Accession number | Medium | Temperature (° C.) |
|---|---|---|
| BCRC 10272 | TSA | 37 |
| BCRC 14718 | Nutrient agar | 30 |
| BCRC 20582 | YM agar | 24 |
| BCRC 21593 | YM agar | 24 |
| BCRC 30118 | PDA | 25 |
| BCRC 30133 | PDA | 25 |
| BCRC 30222 | PDA | 25 |
| BCRC 30235 | PDA | 25 |
| BCRC 31108 | PDA | 25 |
| BCRC 31152 | PDA | 25 |
| BCRC 31494 | PDA | 25 |
| BCRC 31651 | PDA | 25 |
| BCRC 31652 | PDA | 25 |
| BCRC 31883 | PDA | 25 |
| BCRC 32126 | PDA | 25 |
| BCRC 32148 | PDA | 25 |
| BCRC 32229 | PDA | 30 |
| BCRC 32265 | PDA | 25 |
| BCRC 32802 | PDA | 25 |
| BCRC 32963 | PDA | 25 |
| BCRC 33468 | PDA | 25 |
| BCRC 35695 | PDA | 24 |
| BCRC 35696 | PDA | 24 |
| BCRC 35697 | PDA | 24 |

B. Determination of Percentage Reduction of Total Purine Content Regarding Water Extract of *Lentinus edodes*:

For each of the 24 strains, 3.5 mL of the respective spore inoculums as obtained from the preceding section, entitled "A. Preparation of spore inoculums of strains capable of digesting purine bases", was inoculated in the water extract of *Lentinus edodes*, followed by fermentation culture for 16 hours at a 150 rpm shaking speed and at the respective cultivation temperature shown in Table 3. The resultant fermented culture of the water extract of *Lentinus edodes* was centrifuged at 3000×g for 20 minutes. The supernatant, which is a fermented liquid of the water extract of *Lentinus edodes*, was acquired. All of the fermented liquids of the water extracts of *Lentinus edodes*, which were produced using the 24 aforementioned strains, and the unfermented water extract of *Lentinus edodes* were freeze-dried, and percentage reduction of total purine content was determined according to the procedures as described in the section, entitled "1. Determination of percentage reduction of total purine content", of the General Experimental Procedures.

Results:

Table 4 shows percentage reduction of total purine content of the water extract of *Lentinus edodes*, which results from fermentation culture of the water extract of *Lentinus edodes* using the respective one of the 24 strains capable of digesting purine bases. Referring to Table 4, excluding BCRC 10272 (*Bacillus coagulans* Hammer), 23 strains out of the 24 strains are able to lower total purine content of the water extract of *Lentinus edodes*. Particularly, 7 strains (i.e., *Bacillus subtilis* BCRC 14718, *Aspergillus oryzae* BCRC 30118, *Aspergillus oryzae* BCRC 30133, *Aspergillus oryzae* BCRC 30222, *Aspergillus oryzae* BCRC 30235, *Rhizopus oryzae* BCRC 31108, and *Rhizopus oryzae* BCRC 31152) are capable of lowering total purine content by over 68%. *Aspergillus oryzae* BCRC 30235 can even reduce total purine content by 100%.

TABLE 4

Percentage reduction of total purine content of water extract of *Lentinus edodes* resulting from 24 strains capable of digesting purine bases

| Accession number | Percentage reduction of total purine content (%) |
|---|---|
| BCRC 10272 | −6.7 |
| BCRC 14718 | 81.0 |
| BCRC 20582 | 14.9 |
| BCRC 21593 | 62.9 |
| BCRC 30118 | 90.1 |
| BCRC 30133 | 91.2 |
| BCRC 30222 | 91.1 |
| BCRC 30235 | 100.0 |
| BCRC 31108 | 68.2 |
| BCRC 31152 | 83.7 |
| BCRC 31494 | 29.1 |
| BCRC 31651 | 36.8 |
| BCRC 31652 | 36.3 |
| BCRC 31883 | 30.7 |
| BCRC 32126 | 27.4 |
| BCRC 32148 | 14.1 |
| BCRC 32229 | 17.6 |
| BCRC 32265 | 13.2 |
| BCRC 32802 | 7.9 |
| BCRC 32963 | 17.6 |
| BCRC 33468 | 18.4 |
| BCRC 35695 | 38.8 |
| BCRC 35696 | 27.8 |
| BCRC 35697 | 19.4 |

In order to verify the results, the freeze-dried fermented liquid of the water extracts of *Lentinus edodes*, which were produced using the abovementioned 7 strains capable of lowering total purine content by over 68%, were further analyzed for percentage reduction of total purine content generally according to the procedures as described in the section, entitled "1. Determination of percentage reduction of total purine content", of the General Experimental Procedures, except that the following additional procedures were conducted: before performing HPLC, 4 aliquots (each has 10 μL) were obtained from each of the test samples and were respectively added with adenine, guanine, hypoxanthine, and xanthine standards; HPLC was performed so as to measure the actual retention times of adenine, guanine, hypoxanthine, and xanthine standards; and each of the test samples was analyzed based on the aforementioned actual retention times. Results are shown in Table 5.

Referring to Table 5, excluding *Bacillus subtilis* BCRC 14718 and *Rhizopus oryzae* BCRC 31152, 5 strains out of the 7 strains (i.e., *Aspergillus oryzae* BCRC 30118, *Aspergillus oryzae* BCRC 30133, *Aspergillus oryzae* BCRC 30222, *Aspergillus oryzae* BCRC 30235, and *Rhizopus oryzae* BCRC 31108) certainly have the ability to digest purine compounds, thereby being capable of effectively reducing total purine content of the water extract of *Lentinus edodes*. Among the 5 strains, *Aspergillus oryzae* BCRC 30235 has the best ability to digest purine compounds since the same can reduce the total purine content by 53.5%.

TABLE 5

Percentage reduction of total purine content of
water extract of *Lentinus edodes* resulting from
7 strains capable of digesting purine bases

| Accession Number | Percentage reduction of total purine content (%) |
|---|---|
| BCRC 14718 | −25.2 |
| BCRC 30118 | 6.4 |
| BCRC 30133 | 43.5 |
| BCRC 30222 | 20.5 |
| BCRC 30235 | 53.5 |
| BCRC 31108 | 32.8 |
| BCRC 31152 | −17.3 |

*Aspergillus oryzae* BCRC 30118, *Aspergillus oryzae* BCRC 30133, *Aspergillus oryzae* BCRC 30222, *Aspergillus oryzae* BCRC 30235, and *Rhizopus oryzae* BCRC 31108 can be purchased from American Type Culture Collection (ATCC) as well, and accession numbers thereof are ATCC 11493, ATCC 26850, ATCC 44193, ATCC 26831, and ATCC 52362, respectively. Based on the results shown in Table 5, the applicants selected *Aspergillus oryzae* ATCC 26831 (BCRC 30235), *Aspergillus oryzae* ATCC 26850 (BCRC 30133), and *Aspergillus oryzae* ATCC 44193 (BCRC 30222) to conduct the following experiment.

Example 3

Effects of Spore Inoculum Concentration and Fermentation Time of *Aspergillus oryzae* BCRC 30235 on Total Purine Content, Total Protein Content, and Total Polysaccharide Content of Water Extracts of Different Mushroom Products To understand how total purine content, total protein content, and total polysaccharide content of the water extracts of different mushroom products are affected by virtue of spore inoculum concentration and fermentation time of *Aspergillus oryzae* ATCC 26831 (BCRC 30235), the water extract of *Flammulina velutipes*, the water extract of *Pleurotus ostreatus*, and the water extract of *Lentinus edodes* were used in the following experiment.

Experimental Procedures:

A. Preparation of Spore Inoculums of *Aspergillus oryzae* BCRC 30235:

In this experiment, spore inoculums of *Aspergillus oryzae* ATCC 26831 (BCRC 30235) were produced mainly according to the procedures as described in the section, entitled "A. Preparation of spore inoculums of strains capable of digesting purine bases", of the above Example 2, except that a hemocytometer (Bright-Line, Hauser Scientific, Horsham, Pa.) was utilized to calculate an amount of spores in the spore inoculums.

B. Production of Fermented Liquid of Water Extract of Mushroom Product:

First, the water extract of *Lentinus edodes*, the water extract of *Pleurotus ostreatus*, and the water extract of *Flammulina velutipes* were added into 135 shake flasks so that each set of 45 shake flasks contain the water extract of the same mushroom product. The spore inoculums of *Aspergillus oryzae* ATCC 26831 (BCRC 30235), which were obtained from the preceding section entitled "A. Preparation of spore inoculums of *Aspergillus oryzae* BCRC 30235", were inoculated into the three sets of the 45 shake flasks so that the resultant mixtures in each set of the 45 shake flasks had three final spore inoculum concentrations ($3.4 \times 10^5$ spore/mL, $1.3 \times 10^6$ spore/mL, and $3.4 \times 10^6$ spore/mL). Namely, among the mixtures in each set of the 45 shake flasks, the mixtures in each subset of 15 shake flasks were formed to have the same spore inoculum concentration. The shake flasks were placed in a thermostatic incubator shaker with conditions set at 25° C. and 150 rpm so as to allow fermentation culture. At different time points (16 hrs, 24 hrs, 32 hrs, 40 hrs, and 48 hrs), for each of the three mushroom products, three shake flasks containing the mixtures having the same spore inoculum concentration were taken out from the incubator shaker (9 shake flasks for each of the three mushroom products), followed by centrifuging fermented culture of the water extract of the mushroom product at 3000×g for 20 minutes. A portion of supernatant, which was fermented liquid of the water extract of the mushroom product, was obtained so as to determine percentage of residual protein and percentage of residual polysaccharide. The remaining portion of the supernatant (i.e., the fermented liquid of the water extract of the mushroom product) and the unfermented water extract of the mushroom product were freeze-dried, and percentage reduction of total purine content was determined according to the procedures as described in the section, entitled "1. Determination of percentage reduction of total purine content", of the General Experimental Procedures.

C. Determination of Percentage of Residual Protein:

Total protein content was measured using Bio-Rad Protein Assay Kit (Bio-Rad, Cat No. 500-0006). First, 100 µL of the fermented liquid of the water extract of the mushroom product, which was obtained from the preceding section entitled "B. Production of fermented liquid of water extract of mushroom product", was added in a test tube, followed by adding 5 mL of 5-fold diluted protein assay dye reagent concentrate and mixing for 2030 minutes. Subsequently, 1 mL of the resultant mixture was obtained, and absorbance thereof at a wavelength of 595 nm was measured using a spectrophotometer (Beckman DU-800). Similarly, 100 µL of the unfermented water extract of the mushroom product was used to measure absorbance at a wavelength of 595 nm according to the same procedures.

In addition, a standard curve was generated by plotting concentrations (0 µg/mL, 6.25 µg/mL, 12.5 µg/mL, 25 µg/mL, 50 µg/mL, and 100 µg/mL) of bovine serum albumin standard solutions and the respective absorbances ($OD_{595}$).

Absorbances ($OD_{595}$) of the aforementioned resultant mixtures (i.e., the mixture of the fermented liquid of the water extract of the mushroom product and the 5-fold diluted protein assay dye reagent concentrate, and the mixture of the unfermented water extract of the mushroom product and the 5-fold diluted protein assay dye reagent concentrate) were converted to protein concentrations (µg/mL) by virtue of the standard curve. Percentage of residual protein regarding the fermented liquid of the water extract of the mushroom product can be calculated by substituting the calculated concentrations into the following formula:

$$D=(E/F) \times 100 \tag{3}$$

where

D=percentage of residual protein

E=protein concentration of the fermented liquid of the water extract of the mushroom product F=protein concentration of the unfermented water extract of the mushroom product D. Determination of Percentage of Residual Polysaccharide:

The fermented liquid of the water extract of the mushroom product, which was obtained from the preceding section entitled "B. Production of fermented liquid of water extract of mushroom product", was subjected to 5-fold dilution using deionized water. 0.2 mL of the diluted solution was obtained and placed in a test tube, followed by mixing evenly with 0.8 mL of 95% alcohol. The resultant mixture was placed in a refrigerator of −20° C. for 1 hour so as to precipitate polysaccharides, followed by centrifugation at 4° C. and 12,000 rpm for 25 minutes. Crude polysaccharide precipitate was rinsed with 0.8 mL of 75% alcohol, and was subsequently centrifuged at 4° C. and 12,000 rpm for 25 minutes so as to remove impurity. The resultant precipitate was dissolved with 0.2 mL of deionized water, thereby obtaining a sample solution. 0.2 mL of the sample solution was placed in a new test tube, followed by adding 0.2 mL of 5% phenol solution, slowly adding 1 mL of concentrated sulfuric acid, and mixing evenly. The mixture was allowed to react for 30 minutes and was cooled down to room temperature. 1 mL of the mixture was used to measure absorbance thereof at a wavelength of 490 nm using the spectrophotometer (Beckman DU-800). Similarly, the unfermented water extract of the mushroom product was subjected to the same procedures to measure absorbance.

In addition, a standard curve was generated by plotting concentrations (0 μg/mL, 20 μg/mL, 40 μg/mL, 60 μg/mL, 80 μg/mL, and 100 μg/mL) of glucose standard solutions and the respective absorbances ($OD_{490}$).

Absorbances ($OD_{490}$) of the mixtures (i.e., the mixture containing the fermented liquid of the water extract of the mushroom product, and the mixture containing the unfermented water extract of the mushroom product) were converted to polysaccharide concentrations (μg/mL) by virtue of the standard curve. Percentage of residual polysaccharide regarding the fermented liquid of the water extract of the mushroom product can be calculated by substituting the calculated concentrations into the following formula:

$$G=(H/I)\times100 \quad (4)$$

where

G=percentage of residual polysaccharide

Figure 1A:
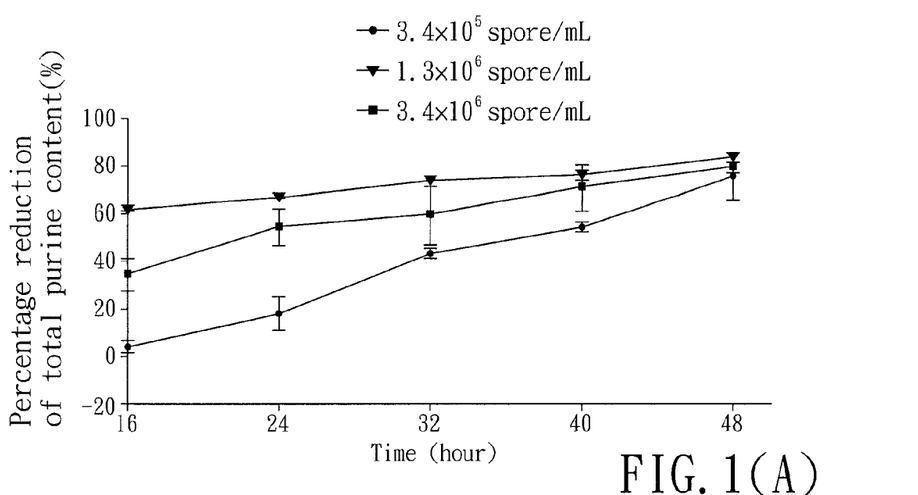
FIGS. 1(A), 1(B), and 1(C) respectively show percentage reduction of total purine content of a water extract of *Lentinus edodes*, and percentage of residual protein and percentage of residual polysaccharide regarding fermented liquid of the water extract of *Lentinus edodes*, in which the circle, the triangle, and the square represent three spore inoculum concentrations of *Aspergillus oryzae* BCRC 30235 used to perform fermentation culture of the water extract of *Lentinus edodes*; and percentage reduction of total purine content, percentage of residual protein, and percentage of residual polysaccharide were determined at different time points (16 hrs, 24 hrs, 32 hrs, 40 hrs, and 48 hrs) of fermentation culture of the water extract of *Lentinus edodes;*
Figure 1B:
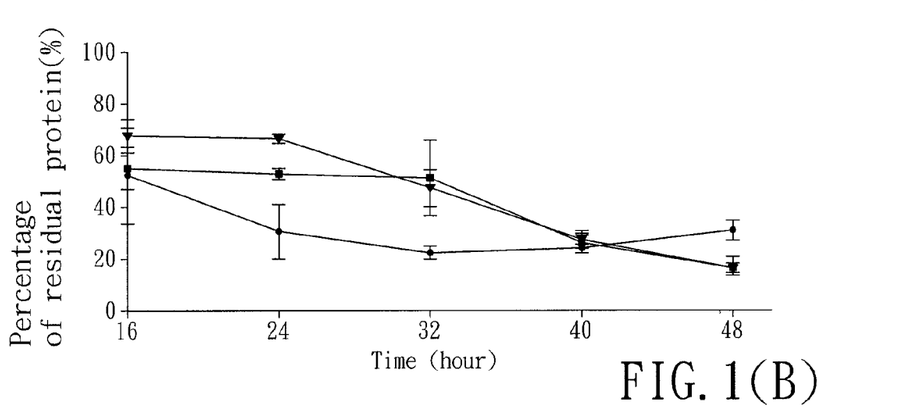
Figure 1C:
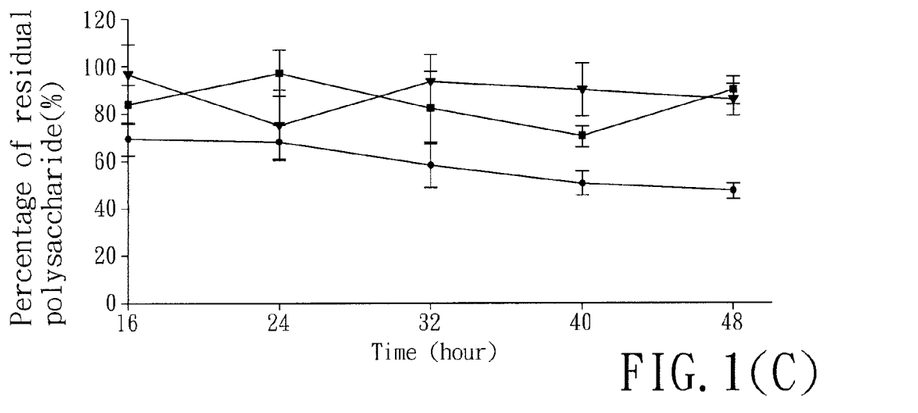

H=polysaccharide concentration of the fermented liquid of the water extract of the mushroom product I=polysaccharide concentration of the unfermented water extract of the mushroom product Results:

FIGS. 1(A), 1(B), and 1(C) respectively show percentage reduction of total purine content of the water extract of *Lentinus edodes*, and percentage of residual protein and percentage of residual polysaccharide regarding the fermented liquid of the water extract of *Lentinus edodes*. Three spore inoculum concentrations of *Aspergillus oryzae* ATCC 26831 (BCRC 30235) were used to perform fermentation culture of the water extract of *Lentinus edodes*. Percentage reduction of total purine content, percentage of residual protein, and percentage of residual polysaccharide were determined at different time points (16 hrs, 24 hrs, 32 hrs, 40 hrs, and 48 hrs) of fermentation culture of the water extract of *Lentinus edodes*.

Referring to FIG. 1(A), when the spore inoculum concentration of *Aspergillus oryzae* ATCC 26831 (BCRC 30235) is $1.3\times10^6$ spore/mL, percentage reduction of total purine content of the water extract of *Lentinus edodes* is the highest. Particularly, total purine content is reduced by 61% at 16 hrs, and total purine content is reduced by 84% at 48 hrs. Referring to FIGS. 1(B) and 1(C), when the spore inoculum concentration of *Aspergillus oryzae* ATCC 26831 (BCRC 30235) is $1.3\times10^6$ spore/mL, percentage of residual protein regarding the fermented liquid of the water extract of *Lentinus edodes* decreases from 68% to 16% with time of fermentation culture; however, percentage of residual polysaccharide thereof remains in the range from 75% to 95%.

Figure 2A:
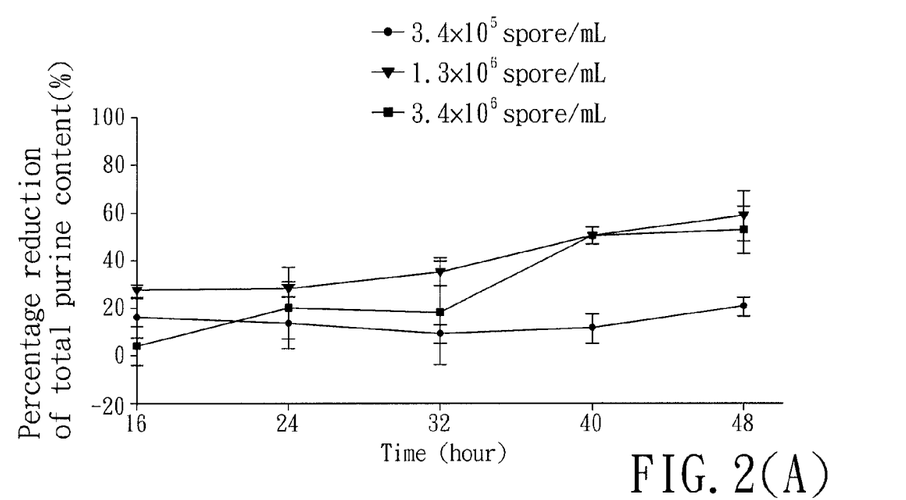
FIGS. 2(A), 2(B), and 2(C) respectively show percentage reduction of total purine content of a water extract of *Pleurotus ostreatus*, and percentage of residual protein and percentage of residual polysaccharide regarding fermented liquid of the water extract of *Pleurotus ostreatus*, in which the circle, the triangle, and the square represent three spore inoculum concentrations of *Aspergillus oryzae* BCRC 30235 used to perform fermentation culture of the water extract of *Pleurotus ostreatus*; and percentage reduction of total purine content, percentage of residual protein, and percentage of residual polysaccharide were determined at different time points (16 hrs, 24 hrs, 32 hrs, 40 hrs, and 48 hrs) of fermentation culture of the water extract of *Pleurotus ostreatus*.
Figure 2B:
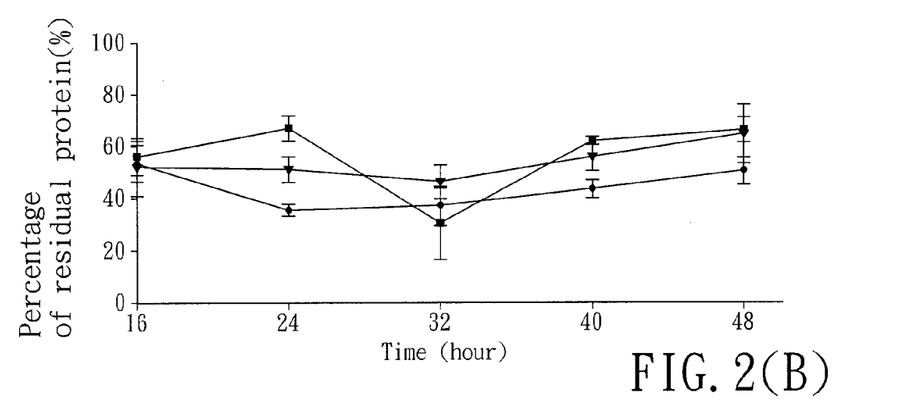
Figure 2C:
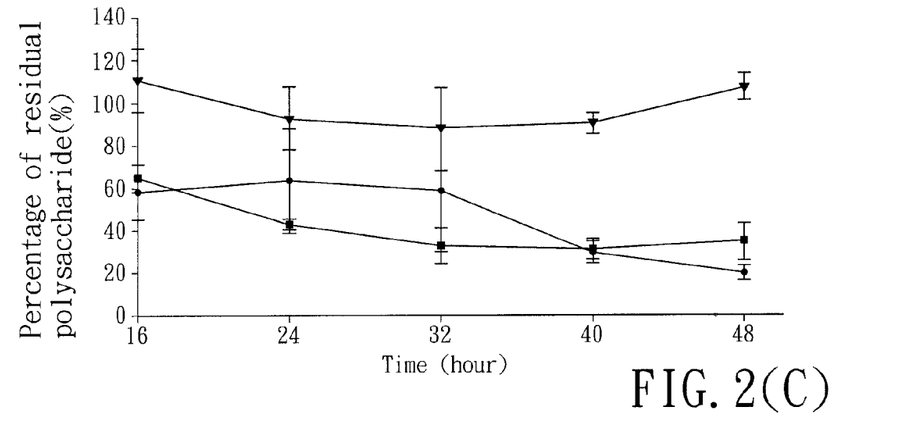

FIGS. 2(A), 2(B), and 2(C) respectively show percentage reduction of total purine content of the water extract of *Pleurotus ostreatus*, and percentage of residual protein and percentage of residual polysaccharide regarding the fermented liquid of the water extract of *Pleurotus ostreatus*. Three spore inoculum concentrations of *Aspergillus oryzae* ATCC 26831 (BCRC 30235) were used to perform fermentation culture of the water extract of *Pleurotus ostreatus*. Percentage reduction of total purine content, percentage of residual protein, and percentage of residual polysaccharide were determined at different time points (16 hrs, 24 hrs, 32 hrs, 40 hrs, and 48 hrs) of fermentation culture of the water extract of *Pleurotus ostreatus*.

Referring to FIG. 2(A), when the spore inoculum concentration of *Aspergillus oryzae* ATCC 26831 (BCRC 30235) is $1.3\times10^6$ spore/mL, percentage reduction of total purine content of the water extract of *Pleurotus ostreatus* is the highest. Particularly, total purine content is reduced by 61% at 48 hrs. Referring to FIGS. 2(B) and 2(C), when the spore inoculum concentration of *Aspergillus oryzae* ATCC 26831 (BCRC 30235) is $1.3\times10^6$ spore/mL, percentage of residual protein regarding the fermented liquid of the water extract of *Pleurotus ostreatus* does not obviously decrease with time of fermentation culture, and approximately remains in the range from 45% to 65%; percentage of residual polysaccharide thereof approximately remains in the range from 90% to 110%, and is higher than percentage of residual polysaccharide resulting from the other two spore inoculum concentrations.

Figure 3A:
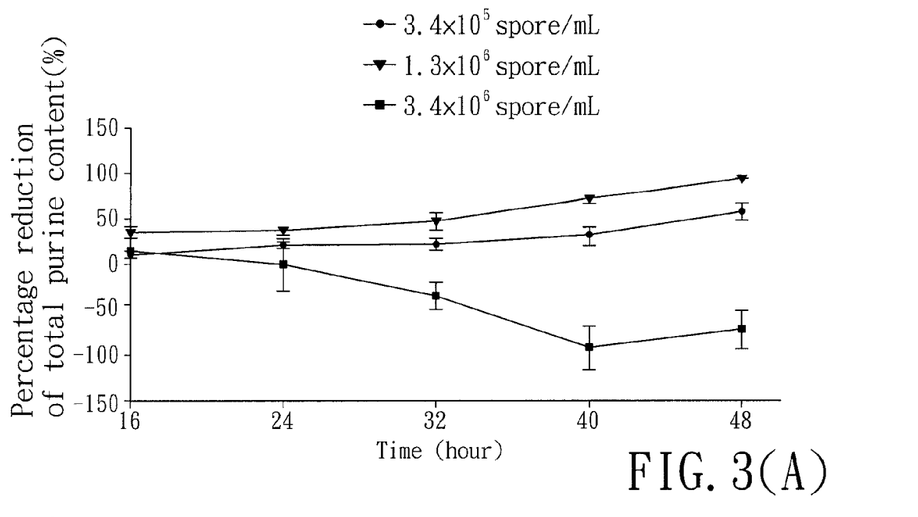
FIGS. 3(A), 3(B), and 3(C) respectively show percentage reduction of total purine content of a water extract of *Flammulina velutipes*, and percentage of residual protein and percentage of residual polysaccharide regarding fermented liquid of the water extract of *Flammulina velutipes*, in which the circle, the triangle, and the square represent three spore inoculum concentrations of *Aspergillus oryzae* BCRC 30235 used to perform fermentation culture of the water extract of *Flammulina velutipes*; and percentage reduction of total purine content, percentage of residual protein, and percentage of residual polysaccharide were measured at different time points (16 hrs, 24 hrs, 32 hrs, 40 hrs, and 48 hrs) of fermentation culture of the water extract of *Flammulina velutipes*.
Figure 3B:
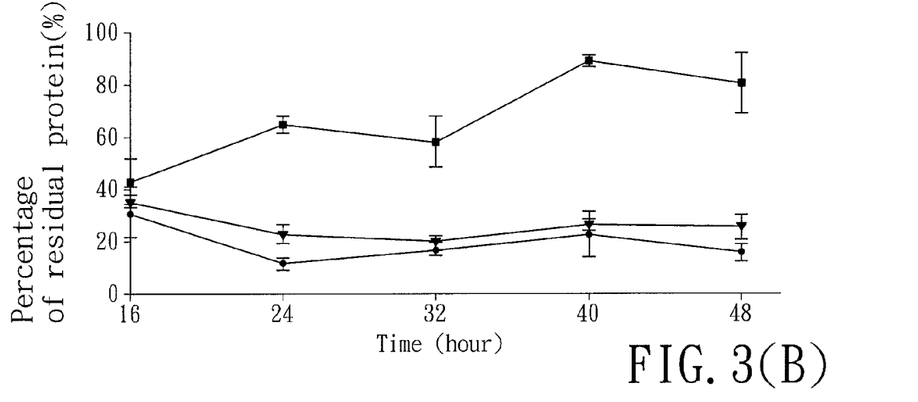
Figure 3C:
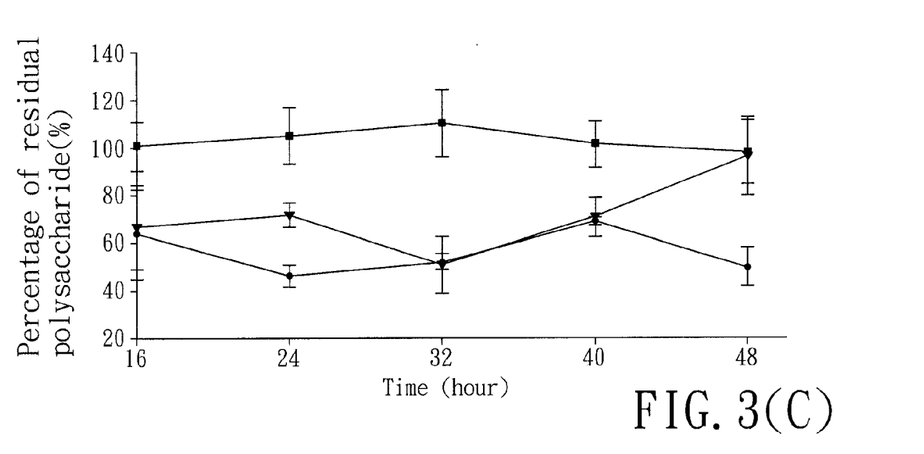

FIGS. 3(A), 3(B), and 3(C) respectively show percentage reduction of total purine content of the water extract of *Flammulina velutipes*, and percentage of residual protein and percentage of residual polysaccharide regarding the fermented liquid of the water extract of *Flammulina velutipes*. Three spore inoculum concentrations of *Aspergillus oryzae* ATCC 26831 (BCRC 30235) were used to perform fermentation culture of the water extract of *Flammulina velutipes*. Percentage reduction of total purine content, percentage of residual protein, and percentage of residual polysaccharide were determined at different time points (16 hrs, 24 hrs, 32 hrs, 40 hrs, and 48 hrs) of fermentation culture of the water extract of *Flammulina velutipes*.

Referring to FIG. 3(A), when the spore inoculum concentration of *Aspergillus oryzae* ATCC 26831 (BCRC 30235) is $1.3\times10^6$ spore/mL, percentage reduction of total purine content of the water extract of *Flammulina velutipes* is the highest. Particularly, total purine content is reduced by 73% at 40 hrs, and total purine content is reduced by 97% at 48 hrs.

It should be noted that when the spore inoculum concentration of *Aspergillus oryzae* ATCC 26831 (BCRC 30235) is $3.4\times10^6$ spore/mL, percentage reduction of total purine content of the water extract of *Flammulina velutipes* decreases until 40 hrs. The increase of the total purine content arises from the dense characteristic of the water extract of *Flammulina velutipes*. Although the fermented culture of the water extract of *Flammulina velutipes* was centrifuged at 3000×g for 20 minutes to remove *Aspergillus oryzae* ATCC 26831 (BCRC 30235), the dense characteristic of the water extract of *Flammulina velutipes* and the high spore inoculum concentration of *Aspergillus oryzae* ATCC 26831 (BCRC 30235) caused incomplete removal of *Aspergillus oryzae* ATCC 26831 (BCRC 30235). Therefore, the purine content of *Aspergillus oryzae* ATCC 26831 (BCRC 30235) remaining in the fermented liquid of the water extract of *Flammulina velutipes* increases the total purine content of the fermented liquid of the water extract of *Flammulina velutipes*. The amount of *Aspergillus oryzae* ATCC 26831 (BCRC 30235)

remaining in the fermented liquid of the water extract of *Flammulina velutipes* increases with the time of fermentation culture, thereby raising the total purine content of the fermented liquid of the water extract of *Flammulina velutipes*.

Referring to FIGS. 3(B) and 3(C), when the spore inoculum concentration of *Aspergillus oryzae* ATCC 26831 (BCRC 30235) is $1.3\times10^6$ spore/mL, percentage of residual protein regarding the fermented liquid of the water extract of *Flammulina velutipes* does not obviously change with time of fermentation culture, and approximately remains in the range from 20% to 35%; percentage of residual polysaccharide thereof approximately decreases to 50% at 32 hrs, but increases to 96% at 48 hrs.

The results reveal that *Aspergillus oryzae* ATCC 26831 (BCRC 30235) is able to effectively digest purine compounds in the water extract of *Lentinus edodes*, the water extract of *Pleurotus ostreatus*, and the water extract of *Flammulina velutipes*. When *Aspergillus oryzae* ATCC 26831 (BCRC 30235) is inoculated into a water extract of a mushroom product with a spore inoculum concentration of $1.3\times10^6$ spore/mL, purine compounds can be most effectively digested.

Example 4

Effects of *Aspergillus oryzae* BCRC 30133 and *Aspergillus oryzae* BCRC 30222 on Total Purine Content of Soybean Milk Experimental Procedures:
A. Preparation of Spore Inoculums of *Aspergillus oryzae* BCRC 30133 and *Aspergillus oryzae* BCRC 30222:

In this experiment, spore inoculums of *Aspergillus oryzae* ATCC 26850 (BCRC 30133) and *Aspergillus oryzae* ATCC 44193 (BCRC 30222) were produced mainly according to the procedures as described in the section, entitled "A. Preparation of Spore Inoculums of Strains Capable of digesting purine bases", of the above Example 2, except that fermentation culture was conducted for 7 days, and an amount of spores in the spore inoculums was measured using the hemocytometer.

B. Determination of Percentage Reduction of Total Purine Content of Soybean Milk:

1 Kg of soybean and 8 Kg of water were placed in a homogenizer (Vita-Mix VM0101B, USA) and were subjected to homogenization for 15 minutes. The resultant homogenate was boiled for 30 minutes, thereby forming soybean milk. 35 mL of the soybean milk was added into each of six 250 mL shake flasks, followed by sterilization at 121° C. and 0.103 MPa for 15 minutes. When the shake flasks were cooled down to the room temperature, the spore inoculums of *Aspergillus oryzae* ATCC 26850 (BCRC 30133) and *Aspergillus oryzae* ATCC 44193 (BCRC 30222), which were obtained in the preceding section entitled "A. Preparation of spore inoculums of *Aspergillus oryzae* BCRC 30133 and *Aspergillus oryzae* BCRC 30222", were inoculated into the six shake flasks with a spore inoculum concentration of $1.3\times10^6$ spore/mL so that each set of three shake flasks contained the spore inoculums of the same microorganism. The shake flasks were placed in a thermostatic incubator shaker with conditions set at 25° C. and 150 rpm for 16 hours so as to allow fermentation culture. The resultant fermented culture of soybean milk was centrifuged at 3000×g for 20 minutes, followed by obtaining the supernatant, which was the fermented liquid of soybean milk. The fermented liquid of soybean milk and unfermented soybean milk were freeze-dried, and percentage reduction of total purine content was determined according to the procedures as described in the section, entitled "1. Determination of percentage reduction of total purine content", of the General Experimental Procedures.
Results:

The results show that when *Aspergillus oryzae* ATCC 26850 (BCRC 30133) and *Aspergillus oryzae* ATCC 44193 (BCRC 30222) are respectively inoculated into soybean milk with a spore inoculum concentration of $1.3\times10^6$ spore/mL so as to allow fermentation culture for 16 hours, the values of percentage reduction of total purine content of soybean milk are 15.24%±6.37% and 39.93%±2.33%, respectively. Based on the results, the applicants believe that *Aspergillus oryzae* ATCC 26850 (BCRC 30133) and *Aspergillus oryzae* ATCC 44193 (BCRC 30222) are able to effectively lower total purine content of purine-compound containing beverages.

All patents and literature references cited in the present specification as well as the references described therein, are hereby incorporated by reference in their entirety. In case of conflict, the present description, including definitions, will prevail.

While the invention has been described with reference to the above specific embodiments, it is apparent that numerous modifications and variations can be made without departing from the scope and spirit of this invention. It is therefore intended that this invention be limited only as indicated by the appended claims.

What is claimed is:

1. A method of reducing the purine content of an edible material, comprising treating an edible material having a first level of purine content with a microorganism capable of digesting purine compounds, such that the thus treated edible material has a second level of purine content lower than the first level of purine content, wherein the microorganism is selected from the group consisting of *Aspergillus oryzae* ATCC 11493, *Aspergillus oryzae* ATCC 26850, *Aspergillus oryzae* ATCC 44193, *Aspergillus oryzae* ATCC 26831, *Rhizopus oryzae* ATCC 52362, and combinations thereof; and the edible material is a mushroom product, a fruit beverage, a vegetable beverage, or a fermented product.

2. The method of claim 1, wherein the microorganism is *Aspergillus oryzae* ATCC 26850, *Aspergillus oryzae* ATCC 44193, *Aspergillus oryzae* ATCC 26831, or combinations thereof.

3. The method of claim 1, wherein the treatment is conducted at a temperature ranging from 20° C. to 37° C.

4. The method of claim 1, wherein the edible material is a mushroom product.

5. The method of claim 4, wherein the edible material is a water extract of the mushroom product.

6. The method of claim 5, wherein the microorganism used to treat the water extract of the mushroom product has a concentration ranging from $3.4\times10^5$ to $30.4\times10^6$ spore/ml.

7. An edible material that contains a reduced level of purine compounds obtained from the following procedure:
treating an edible material having a first level of purine content with a microorganism capable of digesting purine compounds, thereby obtaining an edible material having a second level of purine content that is lower than the first level of purine content,
wherein the microorganism is selected from the group consisting of *Aspergillus oryzae* ATCC 11493, *Aspergillus oryzae* ATCC 26850, *Aspergillus oryzae* ATCC 44193, *Aspergillus oryzae* ATCC 26831, *Rhizopus oryzae* ATCC 52362, and combinations thereof; and the edible material is a mushroom product, a fruit beverage, a vegetable beverage, or a fermented product.

8. The edible material of claim 7, wherein the procedure further includes removing the microorganism from the edible material having the second level of purine content.

9. The method of claim 1, wherein the fermented product is selected from the group consisting of yogurt, sour milk, frozen yogurt, and a lactic acid bacteria-fermented beverage.

10. The edible material of claim 9, wherein the fermented product is selected from the group consisting of yogurt, sour milk, frozen yogurt, and a lactic acid bacteria-fermented beverage.

* * * * *